United States Patent
Daikokuya et al.

(10) Patent No.: US 7,992,035 B2
(45) Date of Patent: Aug. 2, 2011

(54) DISK SELECTION METHOD, RAID CONTROL DEVICE, RAID SYSTEM, AND ITS DISK DEVICE

(75) Inventors: Hidejiro Daikokuya, Kawasaki (JP); Mikio Ito, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 395 days.

(21) Appl. No.: 11/828,643

(22) Filed: Jul. 26, 2007

(65) Prior Publication Data

US 2008/0010505 A1    Jan. 10, 2008

Related U.S. Application Data

(63) Continuation of application No. PCT/JP2005/001018, filed on Jan. 26, 2005.

(51) Int. Cl.
*G06F 11/00* (2006.01)
(52) U.S. Cl. ........... 714/6.1; 714/2; 714/6.2; 714/42
(58) Field of Classification Search .......... 714/6, 2, 714/4.11, 6.1, 6.12, 6.2, 6.3, 6.32, 42
See application file for complete search history.

(56) References Cited

U.S. PATENT DOCUMENTS

| 6,484,235 | B1 * | 11/2002 | Horst et al. ............ 711/114 |
| 2003/0233611 | A1 * | 12/2003 | Humlicek et al. ............ 714/763 |
| 2005/0102552 | A1 * | 5/2005 | Horn .................... 714/6 |
| 2005/0204207 | A1 * | 9/2005 | Arai et al. ................. 714/54 |
| 2006/0041782 | A1 * | 2/2006 | Ali et al. .................... 714/6 |

FOREIGN PATENT DOCUMENTS

| JP | 3-253933 | 11/1991 |
| JP | 9-134258 | 5/1997 |
| JP | 2002-163075 | 6/2002 |
| WO | 00/67250 A3 | 11/2000 |

OTHER PUBLICATIONS

International Search Report of International Published Application PCT/JP2005/001018 (mailed Apr. 26, 2005).

* cited by examiner

*Primary Examiner* — Scott T Baderman
*Assistant Examiner* — Sarai Butler
(74) *Attorney, Agent, or Firm* — Fujitsu Patent Center

(57) ABSTRACT

A response of a disk device during rebuild can be sped up. A disk array control device determines whether or not there is a normal read request during rebuild. If there is a read request during rebuild, data is read by sequentially switching a plurality of disk devices in a certain block size unit lower than a block size in which each disk device reads data during normal read.

14 Claims, 9 Drawing Sheets

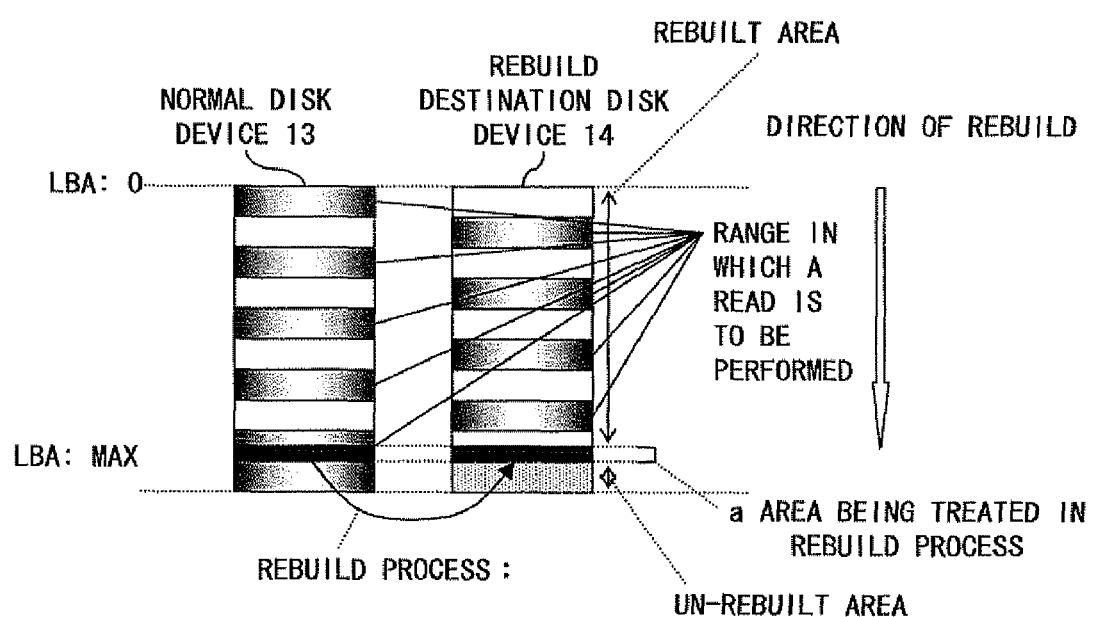
F I G. 3

(1) WHEN READ ADDRESSES ARE DISTRIBUTED EVENLY OVER DISK (A) CONVENTIONAL DISK SELECTION METHOD

|  | READ PROCESS TO BE PERFORMED | MINIMUM SEEK DISTANCE | MAXIMUM SEEK DISTANCE | AVERAGE SEEK DISTANCE |
| --- | --- | --- | --- | --- |
| DISK 1 SIDE | 5, 15, 25, 35, 45 | 50 | 90 | 70 |
| DISK 2 SIDE | 55, 65, 75, 85, 95 | 0 | 40 | 20 |

(B) DISK SELECTION METHOD ACCORDING TO MODE FOR EMBODYING THE PRESENT INVENTION

|  | READ PROCESS TO BE PERFORMED | MINIMUM SEEK DISTANCE | MAXIMUM SEEK DISTANCE | AVERAGE SEEK DISTANCE |
| --- | --- | --- | --- | --- |
| DISK 1 SIDE | 5, 25, 45, 65, 85 | 10 | 90 | 50 |
| DISK 2 SIDE | 15, 35, 55, 75, 95 | 0 | 80 | 40 |

(2) WHEN ADDRESSES CONCENTRATE ON POSITION CLOSE TO LBA=0

(A) CONVENTIONAL DISK SELECTION METHOD

|  | READ PROCESS TO BE PERFORMED | MINIMUM SEEK DISTANCE | MAXIMUM SEEK DISTANCE | AVERAGE SEEK DISTANCE |
| --- | --- | --- | --- | --- |
| DISK 1 SIDE | 1, 4, 7, 10, 13 | 82 | 94 | 88 |
| DISK 2 SIDE | 16, 19, 22, 25, 28 | 67 | 79 | 73 |

(B) DISK SELECTION METHOD ACCORDING TO MODE FOR EMBODYING THE PRESENT INVENTION

|  | READ PROCESS TO BE PERFORMED | MINIMUM SEEK DISTANCE | MAXIMUM SEEK DISTANCE | AVERAGE SEEK DISTANCE |
| --- | --- | --- | --- | --- |
| DISK 1 SIDE | 1, 4, 7, 22, 25, 28 | 67 | 94 | 81 |
| DISK 2 SIDE | 10, 13, 16, 19 | 76 | 85 | 81 |

FIG. 5

(3) WHEN ADDRESSES CONCENTRATE ON POSITION CLOSE TO LBA=99

(A) CONVENTIONAL DISK SELECTION METHOD

|  | READ PROCESS TO BE PERFORMED | MINIMUM SEEK DISTANCE | MAXIMUM SEEK DISTANCE | AVERAGE SEEK DISTANCE |
|---|---|---|---|---|
| DISK 1 SIDE | 71, 74, 77, 80, 83 | 12 | 24 | 18 |
| DISK 2 SIDE | 86, 89, 92, 95, 98 | 0 | 9 | 5 |

(B) DISK SELECTION METHOD ACCORDING TO MODE FOR EMBODYING THE PRESENT INVENTION

|  | READ PROCESS TO BE PERFORMED | MINIMUM SEEK DISTANCE | MAXIMUM SEEK DISTANCE | AVERAGE SEEK DISTANCE |
|---|---|---|---|---|
| DISK 1 SIDE | 80, 83, 86, 89 | 6 | 15 | 11 |
| DISK 2 SIDE | 71, 74, 77, 92, 95, 98 | 0 | 24 | 13 |

FIG. 6

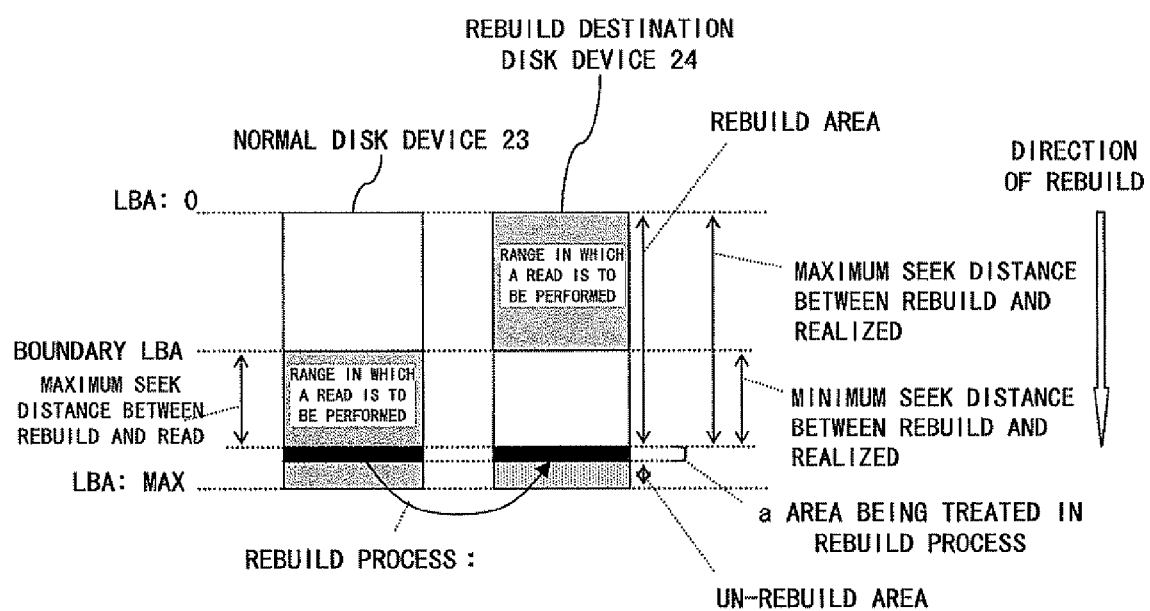
F I G. 9

DISK SELECTION METHOD, RAID CONTROL DEVICE, RAID SYSTEM, AND ITS DISK DEVICE

CROSS-REFERENCE TO RELATED APPLICATIONS

This application is a continuation of International Application No. PCT/JP2005/001018, which was filed on Jan. 26, 2005.

BACKGROUND OF THE INVENTION

1. Field of the Invention

The present invention relates to a disk selection method used with a RAID device, a disk selection program for the method, a RAID control device, a RAID system, and a disk device for the system.

2. Description of the Related Art

There are well known RAID systems for storing data by distributing the data on a plurality of disk devices, and for storing the same data on a plurality of disk devices.

In the RAID system at a RAID1 level for storing the same data on a plurality of disk devices, it is necessary to select a disk device for a read such that data read time can be shortened.

For example, the patent document 1 describes calculating an average value of an access address in the disk array device having a mirroring configuration, comparing a read request address with the calculated address average value, and determining from which disk device the data is to be read.

FIG. 8 is an explanatory view of the conventional disk selection method. Assume that the minimum and maximum values of the logical block address LBA of mirrored disk devices 21 and 22 are "0" and MAX respectively.

When the average value of the addresses of a plurality of read requests is boundary LBA, assume that the disk device for reading data, a disk device for reading data if an address lower than a boundary LBA is specified is defined as the early shift disk device 21, and a disk device for reading data if an address of or over the boundary LBA is specified is defined as the late shift disk device 22.

As described above, by setting the boundary LBA as an average value of the address of a read request, and switching a read destination disk device, the seek distance of the head of each disk device can be reduced.

When one of the RAID devices becomes faulty, it is necessary to copy the same data as the faulty disk device to another disk device. This process is referred to as a rebuilding process.

FIG. 9 is an explanatory view of the seek (travel) distances of a normal disk device 23 and a rebuild destination disk device 24. FIG. 9 shows the case in which the normal disk device 23 is a late shift disk device, and the rebuild destination disk device 24 is an early shift disk device.

Assume that the boundary LBA as an average value of a plurality of read addresses specified by a host computer is a substantially the central address between the maximum value MAX and the minimum value 0 of the LBA of the disk device, and the address of the area a during rebuild is close to the MAX of the LBA.

When the read address requested by the host computer is higher than the boundary LBA, data is read from the normal disk device 23.

In this case, when the read address is a little higher than the boundary LBA, the seek distance for the travel of the head from the area a during rebuild to the position of the read address is the maximum seek distance of the normal disk device 23.

When the read address requested by the host computer is a little lower than the boundary LBA, data is read from the rebuild destination disk device 24 as an early shift disk device.

In this case, when the read address is a little lower than the boundary LBA, the seek distance of the travel of the head from the area a for rebuild to the position of the read address is the minimum seek distance. When the read address is the minimum value of "0", the seek distance of a moved head from the area a during rebuild to the position is the maximum seek distance.

Depending on whether or not the above-mentioned read address is equal to or higher than the boundary LBA, the seek distance of a head for performing a normal read during rebuild is long in the disk selection method for switching the read destination disk device, thereby causing the problem of speeding down the response to the read request of the host computer.

[Patent Document 1] Japanese Published Patent Application No. 2002-163075

SUMMARY OF THE INVENTION

The present invention aims at speeding up the response of a disk device during rebuild.

The present invention is a disk selection method for use with a plurality of disk devices having a mirroring configuration, and aims at determining whether or not there is a read request during rebuild in which the same data as data stored in a faulty disk device is stored in another disk device, and if there is a read request during rebuild, sequentially selecting and reading the plurality of disk devices in a certain block size unit lower than the block size unit in which each disk device performs a normal read.

According to the present invention, the unbalanced seek distance of the head of each disk device can be reduced by reading data after switching the read destination disk device in the certain block size unit during rebuild lower than during normal read. Thus, the response of the disk device can be sped up when the travel distance of a head is high.

In the disk selection method according to the above-mentioned invention, it is determined during normal read whether or not the read address is equal to or higher than a reference address, the plurality of disk devices are switched and perform a read on the basis of the determination result, and if there is a read request during rebuild, sequentially selecting and reading the plurality of disk devices in the certain block size unit lower than the block size unit in which each disk device performs a normal read.

With the above-mentioned configuration, the seek distance of the head of each disk device can be reduced and the response to a read request can be sped up during normal read, and the unbalanced seek distance of the head of each disk device can be reduced and the response to a read request relating to a high head travel distance can be sped up during rebuild.

In the disk selection method according to the above-mentioned invention, the plurality of disk devices include at least two disk devices, and one of the two disk devices is selected depending on whether the value obtained by dividing the block address associated with the read request by an integer N is an even number or an odd number, and reads data.

With the configuration, by switching the read destination disk device in a block size unit depending on the integer N, the unbalanced seek distances of the heads of two disk devices can be reduced, and the response to the read request relating to a high seek distance of a head can be sped up.

In the above-mentioned invention, the plurality of disk devices include at least two disk devices, one of the two disk devices is selected depending on whether or not the block address associated with a read request is equal to or higher than the average value of a plurality of block addresses to be read during normal read, and when there is a read request during rebuild, one of the two disk devices is selected depending on whether the value obtained by dividing the block address associated with the read request by an integer N is an even number or an odd number, and reads data.

With the above-mentioned configuration, data can be evenly read by switching the read destination disk device depending on whether or not the block address associated with a read is equal to or higher than an average value during normal read. In addition, by reading data by sequentially switching the two disk devices in a certain block size unit during rebuild, the unbalanced seek distances of the heads of the two disk devices can be reduced. Thus, the response to the data read request of the RAID device can be sped up.

According to the above-mentioned invention, the plurality of disk devices include two disk devices, the two disk devices are alternately selected in the certain block size unit, which is ¼ or less than the maximum number of blocks of the disk device, and data is read.

With the above-mentioned configuration, when a normal data read request is issued during rebuild, the read request relating to a longer seek distance of the head is substantially equally allocated to the two disk devices, thereby speeding up the response of the entire disk devices.

BRIEF DESCRIPTION OF THE DRAWINGS

FIG. 3 shows a range in which each disk device is to read data;

FIG. 5 is an explanatory view (1) of a seek distance;

FIG. 6 is an explanatory view (2) of a seek distance;

FIG. 9 is an explanatory view showing the seek distance of a normal disk and a rebuild destination disk.

DESCRIPTION OF THE PREFERRED EMBODIMENTS

Figure 1:
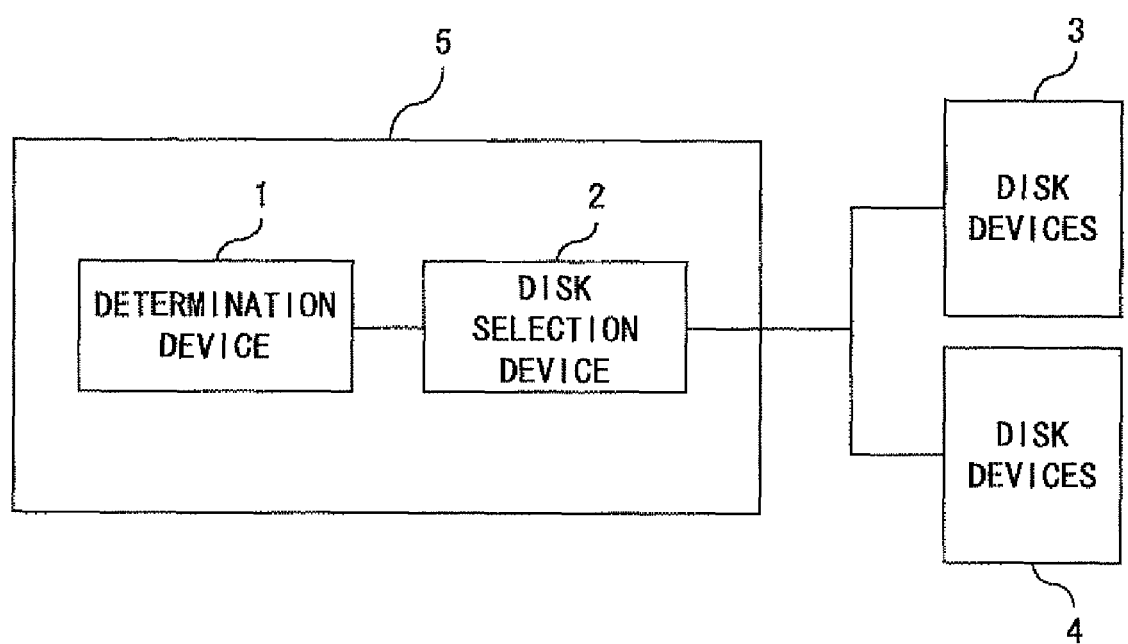
FIG. 1 is an explanatory view showing the basic configuration of the RAID device.

FIG. 1 is an explanatory view showing the basic configuration of the RAID device according to the present invention. In FIG. 1, the RAID device includes a RAID control device 5 and a plurality of disk devices 3 and 4.

When the same data is stored in a plurality of disk devices, the RAID control device 5 includes a determination device 1 for determining whether or not there is a read request during rebuild in which the same data as data stored in a faulty disk device is stored in another disk device, and a disk selection device 2 sequentially selecting the plurality of disk devices in a certain (predetermined) block size unit lower than the block size of a read by each disk device during normal read when it is determined by the determination device 1 that there is a read request during rebuild.

According to the above-mentioned RAID control device 5, the unbalanced head seek distance of each disk device can be reduced by reading data during rebuild after switching the disk devices in the certain block size unit lower than during normal read. Thus, the response of the disk device relating to a high travel distance of a head can be sped up.

In the above-mentioned RAID control device 5, the disk selection device 2 switches the read destination disk device and reads data depending on whether or not the read address is equal to or higher than a reference address during normal read. When there is a data read request during rebuild, the read destination disk device is sequentially switched and read in the certain block size unit.

With the above-mentioned configuration, the seek distance of the head of each disk device can be reduced and the response to a read request can be sped up during normal read, and the unbalanced seek distance of the head of each disk device can be reduced and the response to a read request relating to a high head travel distance can be sped up during rebuild.

In the above-mentioned RAID control device 5, the plurality of disk devices include at least two disk devices, and when the determination device 1 determines that there is a read request during rebuild, the disk selection device 2 selects one of the two disk devices depending on whether the value obtained by dividing the block address associated with the read request by an integer N is an even number or an odd number, and reads data.

With the configuration, by switching the read destination disk device in a block size unit depending on the integer N, the unbalanced seek distances of the heads of two disk devices can be reduced, and the response to the read request relating to a high seek distance of a head can be sped up.

In the RAID control device 5, the plurality of disk devices include at least two disk devices, and the disk selection device 2 selects one of the two disk devices during normal data read depending on whether or not the block address relating to a read request is equal to or higher than the average value of a plurality of block addresses for the read. When the determination device 1 determines that there is a read request during rebuild, the disk selection device 2 selects one of the two disk devices depending on whether the value obtained by dividing the block address associated with the read request by an integer N is an even number or an odd number, and reads data.

With the above-mentioned configuration, the seek distance of the head of each disk device can be reduced and the response to a read request can be sped up during normal read, and the unbalanced seek distance of the head of each disk device can be reduced and the response to a read request relating to a high head travel distance can be sped up during rebuild.

Figure 2:
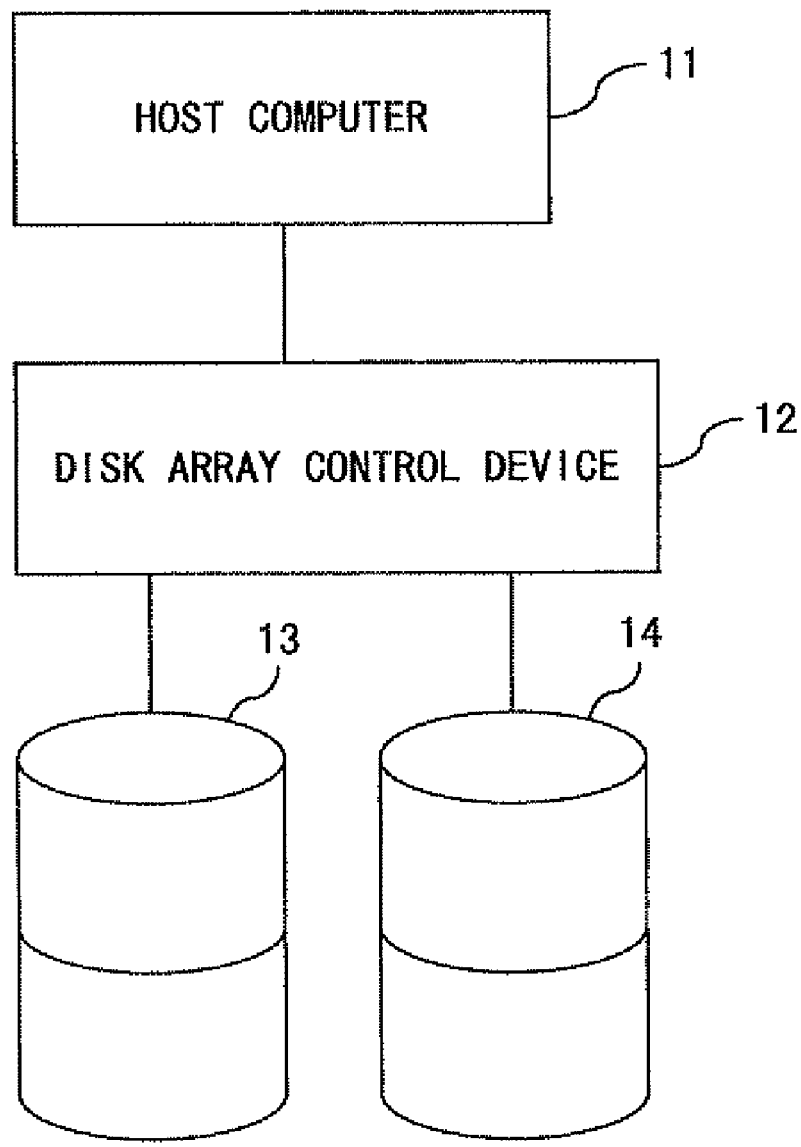
FIG. 2 shows the RAID device according to a mode for embodying the present invention.

The modes for embodying the present invention are explained below by referring to the attached drawings. FIG. 2 shows the configuration of the system (RAID device) of the RAID1 according to a mode for embodying the present invention.

The RAID system includes a host computer 11, a disk array control device (RAID control device) 12, and at least two disk devices 13 and 14.

The disk array control device 12 and a plurality of disk devices 13 and 14 without the host computer 11 shown in FIG. 2 can be defined as a RAID device.

The disk array control device 12 instructs the disk device 13 or 14 to write or read data at an instruction from the host computer 11.

The disk array control device 12 has a CPU, memory, and ROM and the like for storing a control program and other data, and performs a disk selection process described later.

The disk devices 13 and 14 include a hard disk drive and the like, and each of them has a CPU, memory, etc.

First described is the disk selection method used when a data read request (other than the data read request in the rebuild process) is issued while performing the rebuild process. In the mode for embodying the present invention, when a read request is issued during the rebuild process, the normal disk device 13 and the rebuild destination disk device 14 are alternately selected and data is read in a certain block size unit lower than the block size in which each disk device reads data during normal read in which the rebuild process is not being performed.

FIG. 3 shows the ranges in which the normal disk device 13 and the rebuild destination disk device 14 are to read data when read destination disk devices are to be alternately selected in the unit of a certain number N of blocks when there is a read request, during rebuild, other than a data read request in the rebuild process. In FIG. 3, the ranges in which the normal disk device 13 and the 14 are to read data are alternately allocated in the respective units of the certain number N of blocks.

For example, when the logical block address LBA relating to the read request is in the range of "0~N−1", the normal disk device 13 reads data. When the logical block address LBA is in the range of "N~2N−1", the rebuild destination disk device 14 reads data. When the logical block address LBA is in the range of "2N~3N−1", the normal disk device 13 reads data. Similarly, a range in which data can be read is allocated alternately to the two disk devices 13 and 14 in the unit of the number N of blocks.

Figure 4:
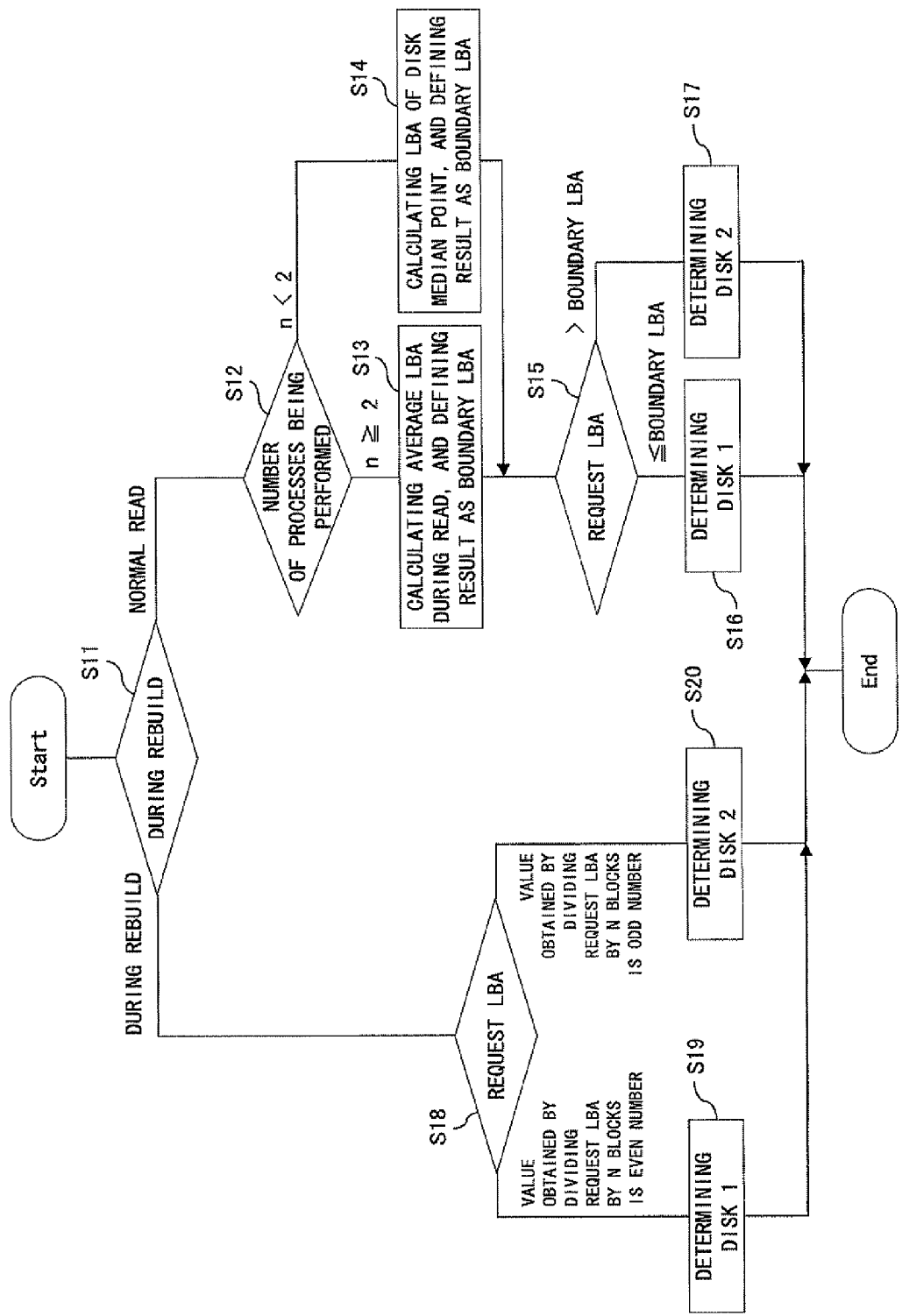
FIG. 4 is a flowchart of the disk selection process according to the first mode for embodying the present invention.

Described next by referring to the flowchart shown in FIG. 4 is the disk selection process according to the mode for embodying the present invention used when there is a read request during normal data read and during rebuild. The following process is performed by the CPU of the disk array control device 12 or realized by firmware.

First, it is determined whether or not the rebuild process is being performed in which the same data as data stored in a faulty disk device is written to another disk device (S11 in FIG. 4).

In step S11, if it is determined that the process is not the rebuild process, but it is in the operation mode in which data is normally read or written, then control is passed to step 12, and it is determined whether or not the number of read requests from the host computer 11 is two or more, that is, it is determined whether or not the number n of the read request being processed is two or more.

If the number n of the requests being processed is two or more (n≧2 in S12), then control is passed to step 13, the average value of the logical block address LBA being read by each of the disk devices 13 and 14 is calculated, and the average value is stored as the boundary LBA in the memory. The logical block address LBA output from the disk array control device 12 to the disk devices 13 and 14 is stored in the memory in the disk array control device 12.

If the number n of the requests being processed is less than 2 (n<2 in S12), control is passed to step 14, the LBA as a median point of the logical block address LBA of the disk devices 13 and 14 is calculated, and the obtained value is set as a boundary LBA. The boundary LBA is stored in the memory, the register, etc. of the disk array control device 12.

After step 13 or 14, it is determined whether or not the logical block address LBA corresponding to the read request of the host computer is equal to or lower than the boundary LBA (S15).

If the requested logical block address LBA is equal to or lower than the boundary LBA (request LBA≦boundary LBA in S15), then control is passed to step S16, the early shift disk device 13 (Disk 1) for the LBA equal to or lower than the boundary LBA is selected, and data is read.

If the requested logical block address LBA is higher than the boundary LBA (S15, request LA>boundary LBA), then control is passed to step 17, the late shift disk device (Disk 2) is selected, and data is read.

If it is determined in step 11 that there is a read request other than a data read request in the rebuild process during rebuild, control is passed to step S18 shown in FIG. 4, and it is determined whether the value obtained by dividing the logical block address LBA relating to the read request by the number N (integer) of blocks as the certain block size unit lower than the block size in which each of the disk devices 13 and 14 is to read data during normal read in which no rebuild process is being performed is an even number or an odd number.

If the quotient obtained using the number N of blocks as a divisor is an even number, then control is passed to step S19, and the disk device 13 (Disk 1) is selected as a read destination disk device.

If the quotient obtained using the number N of blocks as a divisor is an odd number, then control is passed to step S20, and the disk device 14 (Disk 2) is selected as a read destination disk device.

The contents of the disk selection process described above by referring to FIG. 3 are practically explained below. In FIG. 3, the ranges of read of the normal disk device 13 and the rebuild destination disk device 14 are alternately allocated in a certain number N of blocks.

If a fault occurs in a disk device not shown in the attached drawings, then data is read from the normal disk device 13 storing the same data as the faulty disk device, and the read data is copied to the rebuild destination disk device 14. In FIG. 3, the black area a is an area currently being rebuilt. In the example shown in FIG. 3, it is close to the maximum value MAX of the logical block address LBA.

When a read request is issued from the host computer 11 during rebuild, the disk array control device 12 determines whether the value obtained by dividing the logical block address LBA corresponding to the requested address by a certain number N of blocks is an even number of an odd number.

If a read request (other than the data read request in the rebuild process) is issued during the rebuild process, and the value obtained by dividing the logical block address LBA relating to the read request by the number N of blocks is, for example, "0" (even number) then the normal disk device 13 is selected as a read destination disk device. In this case, the area of N blocks is designated as a range in which a read is to be performed from the minimum value "0" of the logical block address LBA.

Next, if the value obtained by dividing the logical block address LBA relating to another read request by the number N of blocks is, for example, "1", then the rebuild destination disk device 14 is selected as a read destination disk device. In this case, the area of N blocks is designated as a range in which a read is to be performed from the logical block address "N".

Next, if the value obtained by dividing the logical block address LBA relating to another read request by the number N of blocks is, for example, "2", then the normal disk device 13 is selected again as a read destination disk device. In this case, the area of N blocks is designated as a range in which a read is to be performed from the logical block address "2N".

Similarly, as shown in FIG. 3, the normal disk device 13 and the rebuild destination disk device 14 are alternately assigned a range in which a read is to be performed in N block units, and the disk array control device 12 alternately selects the normal disk device 13 and the rebuild destination disk device 14 as a read destination disk device in a certain unit of block size (in N block units in the mode for embodying the present invention).

In the above-mentioned mode for embodying the present invention, when there is a read request during the rebuild process, the unbalanced seek distance of the heads of a plurality of disk devices can be reduced by reading data by sequentially switching the plurality of disk devices in a certain unit of block size lower than the block size in which a read is to be performed by each disk device during normal read in which the rebuild process is not being performed. Thus, the response time of each of the disk devices 13 and 14 to the read request of the host computer 11 can be shortened with the difference in seek distance of the heads of two disk devices reduced when the position separate from the area in which the rebuild process is being performed is specified as a read destination. Thus, the time required to terminate the rebuild process concurrently performed can be shortened, and the maximum time required to terminate the process can be determined.

A certain block size as a reference in switching the two disk devices 13 and 14 can be an appropriate value depending on the disk device to be used. For example, it can be set as a block size ¼ or less than the maximum number of blocks of the disk device.

The conventional disk selection method is compared with the seek distance of the head in the disk selection method according to the mode for embodying the present invention by referring to the explanatory views shown in FIGS. 5 and 6.

The conventional disk selection method is to read data by selecting an early shift disk device or a late shift disk device on the basis of the average value of read addresses.

The early shift disk device in the conventional disk selection method is hereinafter referred to as Disk 1, and the late shift disk device as Disk 2. In the mode for embodying the present invention, the copy source disk device in the rebuild process is referred to as Disk 2 while the copy destination disk device (rebuild destination disk device) as Disk 1.

For simpler explanation, it is assumed that the Disk 1 and Disk 2 have addresses for 100 blocks from "0" through "99" as logical block addresses LBA. Furthermore, in the disk selection method of the mode for embodying the present invention, Disk 1 and Disk 2 are alternately switched in 10 block units during rebuild.

First, the seek distance of the conventional disk selection method is compared with the seek distance of the disk selection method according to the mode for embodying the present invention in the case where read request addresses are distributed evenly over the disks (case (1) shown in FIG. 5).

Assume that there are read requests for the logical block addresses LBA "5, 15, 25, 35, 45, 55, 65, 75, 85, and 95", and the position of the logical block address LBA=95 is in the area being treated during the rebuild process.

In this case, since the boundary LBA is an average value of "50" of read addresses in the conventional disk selection method, Disk 1 is selected as a read destination disk device when the read addresses are LBA=5, 15, 25, 35, and 45, and Disk 2 is selected as a read destination disk device when the read addresses are LBA=55, 65, 75, 85, and 95.

On the other hand, in the disk selection method according to the mode for embodying the present invention, when the read address is, for example, LBA=5, the quotient of "0" (even number) is obtained as a result of the division 5÷10, Disk 1 is selected as a read destination disk device, and data is read. When the read address is LBA=15, the quotient of "1" (even number) is obtained as a result of the division 15÷10, Disk 2 is selected as a read destination disk device, and data is read. When the read address is LBA=25, the quotient of "2" (even number) is obtained as a result of the division 25÷10, Disk 1 is selected as a read destination disk device, and data is read.

Similarly, when the quotient is an even number obtained as a result of the division of dividing the LBA by the number "10" of blocks, Disk 1 is selected. When it is an odd number, Disk 2 is selected. Thus, Disk 1 and Disk 2 are alternately selected as a read destination disk device in the certain block size unit (for example, 10 block units).

As a result, when the logical block addresses LBA are "5, 25, 45, 65, and 85", Disk 1 is selected, and when the logical block addresses LBA are "15, 35, 55, 75, and 95", Disk 2 is selected.

As shown by (1) in FIG. 5, in the conventional disk selection method, the minimum, maximum, and average seek distances of the Disk 1 from the position of LBA=95 during rebuild are "50", "90", and "70" respectively, and the maximum and minimum seek distances of Disk 2 are respectively "40" and "20".

In the mode for embodying the present invention, the minimum, maximum, and average seek distances of the Disk 1 from the position of LBA=95 during rebuild are "10", "90", and "50" respectively, and the maximum and minimum seek distances of Disk 2 are respectively "80" and "40".

When both cases are compared with each other when the seek distances of Disk 1 are high, the average seek distance from the position during rebuild is "70" in the conventional disk selection method while the average seek distance from the position during rebuild is "50" in the disk selection method according to the mode for embodying the present invention.

That is, in the conventional disk selection method, an average head travel distance of 70×2=140 blocks is required to move the head from the area during rebuild to the data read position relating to the read request, and to move again the head to the original position. However, in the disk selection method according to the mode for embodying the present invention, only the travel distance of the head of 50×2=100 blocks is required.

Therefore, in the disk selection method according to the mode for embodying the present invention, the seek distance of the head of Disk 1 can be reduced and the unbalanced seek distances between Disk 1 and Disk 2 can be reduced when read addresses are evenly scattered on the entire disk. Therefore, the response time of Disk 1 relating to the read request in which the seek distance of the head during rebuild is high can be shortened. Thus, the response to the read request on the entire disk device can be sped up.

Next, the conventional disk selection method is compared with the disk selection method according to the mode for embodying the present invention relating to the seek distance when read addresses concentrates on the position close to LBA=0 (in the case of (2) shown in FIG. 5).

Suppose there are read requests to the logical block addresses LBA "1, 4, 7, 10, 13, 16, 19, 22, 25, and 28".

In this case, in the conventional disk selection method, the boundary LBA is an average value of "14.5" of the LBA relating to the read request. Therefore, when the read addresses LBA=1, 4, 7, 10, and 13, Disk 1 is selected as a read destination disk device. When the read addresses LBA=16, 19, 22, 25, and 28, Disk 2 is selected as a read destination disk device.

On the other hand, in the disk selection method according to the mode for embodying the present invention, when the read address LBA=1, 4, 7, 22, 25, and 28, the quotient obtained by dividing the value of the LBA by "10" as a block size unit is an even number, Disk 1 is selected as a read destination disk device, and data is read. When LBA=10, 13, 16, and 19, the quotient obtained by dividing the value of the LBA by "10" is an odd number, Disk 2 is selected as a read destination disk device, and data is read.

As shown by (2) in FIG. 5, in the conventional disk selection method, the minimum, maximum, and average seek distances of the Disk 1 from the position of LBA=95 during rebuild are "82", "94", and "88" respectively, and the minimum, maximum, and average seek distances of Disk 2 are respectively "67", "79" and "73".

In the disk selection method according to the mode for embodying the present invention, the minimum, maximum, and average seek distances of the Disk 1 from the position of LBA=95 during rebuild are "67", "94", and "81" respectively, and the minimum, maximum, and average seek distances of Disk 2 are respectively "76", "85" and "81".

When both cases are compared with each other when the seek distances of Disk 1 are high, the average seek distance from the position during rebuild is "88" in the conventional disk selection method while the average seek distance from the position during rebuild is "81" in the disk selection method according to the mode for embodying the present invention.

That is, in the conventional disk selection method, an average head travel distance of 88×2=176 blocks is required to move the head from the area during rebuild to the data read position relating to the read request, and to move again the head to the original position. However, in the disk selection method according to the mode for embodying the present invention, only the travel distance of the head of 82×2=162 blocks is required.

Therefore, according to the disk selection method in the mode for embodying the present invention, although the read addresses concentrate on the position close to the LBA=0 separate from the area during rebuild, the unbalanced seek distances of the head of each disk device can be reduced and the average seek distance of Disk 1 can be shortened. Therefore, the response time of Disk 1 relating to the read request in which the seek distance of the head during rebuild is high can be shortened. Thus, the response on the entire disk device can be sped up.

Next, the conventional disk selection method is compared with the disk selection method according to the mode for embodying the present invention relating to the seek distance when read addresses concentrates on the position close to LBA=90 (in the case of (3) shown in FIG. 6).

Suppose there are read requests to the logical block addresses LBA="71, 74, 77, 80, 83, 86, 89, 92, 95, and 98", and the position of the logical block address LBA=95 is an area to be treated in the rebuild process.

In this case, in the conventional disk selection method, the boundary LBA is an average value of "85.3" of the LBA relating to the read request. Therefore, when the read addresses LBA=71, 74, 77, 80, and 83, Disk 1 is selected as a read destination disk device. When the read addresses LBA=86, 89, 92, 95, and 98, Disk 2 is selected as a read destination disk device.

On the other hand, in the disk selection method according to the mode for embodying the present invention, when the read address LBA=71, 74, 77, 92, 95, and 98, the quotient obtained by dividing the value of the LBA by "10" as a block size unit is an odd number, Disk 2 is selected as a read destination disk device, and data is read. When LBA=80, 83, 86, and 89, the quotient obtained by dividing the value of the LBA by "10" is an even number, Disk 1 is selected as a read destination disk device, and data is read. Thus, Disk 1 and Disk 2 are alternately selected in 10 block units, and data is read.

As shown in FIG. 6, in the conventional disk selection method, the maximum seek distance of Disk 1 from the position of the LBA=95 during rebuild is "24", and the average seek distance is "18", the maximum seek distance of Disk 2 is "9", and the average seek distance is "5".

On the other hand, in the disk selection method according to the mode for embodying the present invention, the maximum seek distance of Disk 1 from the position of the LBA=95 during rebuild is "15", and the average seek distance is "11", the maximum seek distance of Disk 2 is "24", and the average seek distance is "13".

When Disk 1 having a high average seek distance in the conventional disk selection method is compared with Disk 2 in the disk selection method according to the mode for embodying the present invention, the average seek distance of Disk 1 from the position during rebuild is "18" in the conventional disk selection method while the average seek distance of Disk 2 from the position during rebuild is "11" in the disk selection method according to the mode for embodying the present invention.

That is, in the conventional disk selection method, an average head travel distance of 18×2=36 blocks is required to move the head from the area during rebuild to the data read position relating to the read request, and to move again the head to the original position. However, in the disk selection method according to the mode for embodying the present invention, only the travel distance of the head of 13×2=26 blocks is required.

Therefore, although read addresses concentrate on the position close to the area during rebuild, the disk selection method according to the mode for embodying the present invention can attain a shorter average seek distance of the Disk 2 in which more read requests can be processed as compared with the conventional method. Therefore, the response time of disk device relating to the read request in which the seek distance of the head during rebuild is high can be shortened as compared with the conventional disk selection method. Thus, the response to the read request on the entire RAID device can be sped up.

Figure 7:
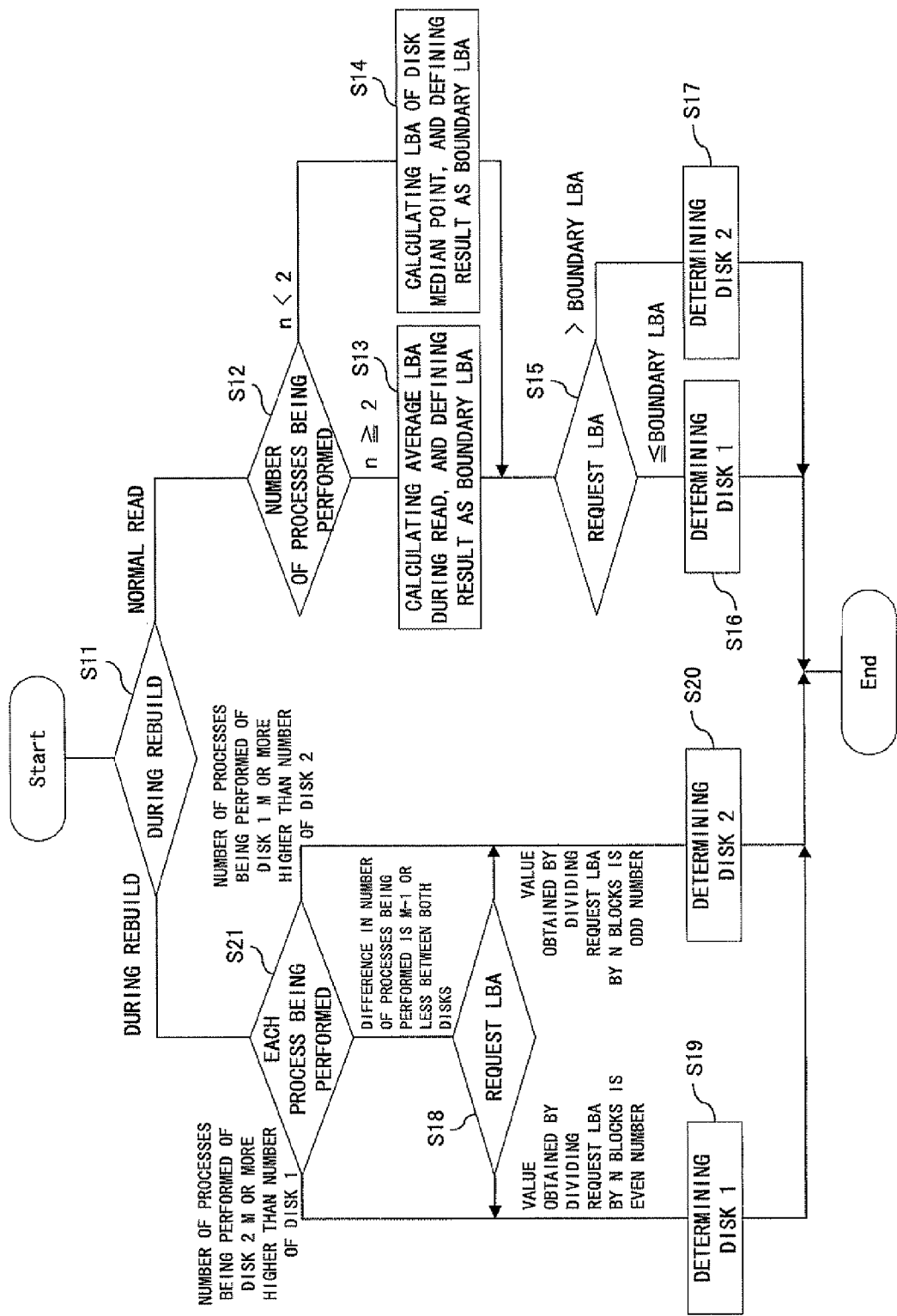
FIG. 7 is a flowchart of the disk selection process according to the second mode for embodying the present invention.
Figure 8:
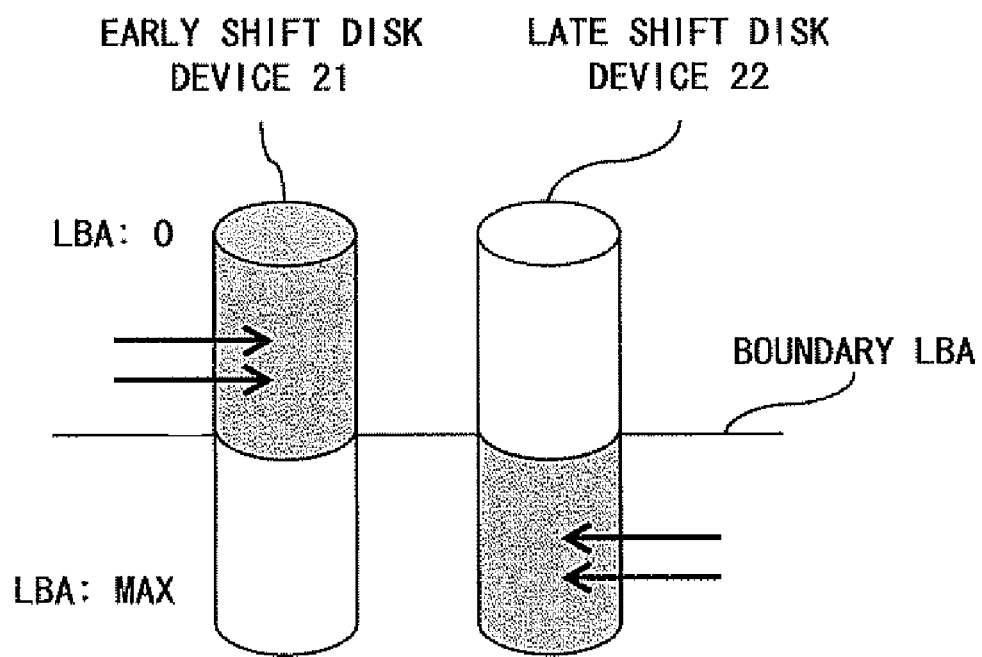
FIG. 8 is an explanatory view showing the conventional disk selection method.

FIG. 7 is a flowchart of the disk selection method according to the second mode for embodying the present invention. In the second mode for embodying the present invention, there is the possibility that a biased read process can be performed depending on the range in which a read is to be performed and assigned to two disk devices. Therefore, the process of avoiding the concentration of a load on a specific disk device is added to the flowchart shown in FIG. 3. The following process is performed by the CPU of the disk array control device 12, or realized by firmware.

In the flowchart shown in FIG. 7, since the processes in steps S11 through S17 are the same as the processes in the corresponding steps of the flowchart shown in FIG. 4, the explanation is omitted here.

If it is determined in step 11 that there is a data read request during rebuild (including a request other than the data read request in the rebuild process), then control is passed to step S21 shown in FIG. 7, the number of processes being performed by the rebuild destination disk device 14 (Disk 2) is compared with the number of processes being performed by the normal disk device 13 (Disk 1), and it is determined whether or not the number of processes being performed of the disk device 14 is M or more higher than the number of processes being performed by the normal disk device 13, whether or not the number of processes being performed of the normal disk device 13 is M or more higher than the number of processes being performed of the rebuild destination disk device 14, or whether or not the difference between the numbers of processes being performed by both disk devices 13 and 14 is M−1 or lower.

In step 21, if it is determined that the number of processes being performed by the rebuild destination disk device 14 (Disk 2) is M or more higher than the number of processes being performed of the normal disk device 13 (Disk 1), that is, the load of the rebuild destination disk device 14 is heavy, then control is passed to step S19, and the normal disk device 13 (Disk 1) having a lower load as a read destination disk device is selected.

In step S21, if it is determined that the number of processes being performed by the normal disk device 13 (Disk 1) is M or more higher than the number of processes being performed of the rebuild destination disk device 14 (Disk 2), that is, the load of the normal disk device 13 is heavy, then control is passed to step S20, and the rebuild destination disk device 14 (Disk 2) having a lower load as a read destination disk device is selected.

If it is determined in step S21 that the difference between the numbers of processes being performed by the disk devices 13 and 14 is M−1 or less, then control is passed to step S18, and it is determined whether the value obtained by dividing the logical block address LBA relating to the read request by the number B (integer) of blocks as a certain block size unit lower than the block size to be read by each of the disk devices 13 and 14 during normal read in which the rebuild process is not being performed is an even or odd number.

If the quotient obtained by dividing the address by the number N of blocks is an even number, control is passed to step S19, and the normal disk device 13 (Disk 1) is selected as a read destination disk device.

If the quotient obtained by dividing the address by the number N of blocks is an odd number, control is passed to step S20, and the rebuild destination disk device 14 (Disk 2) is selected as a read destination disk device.

For example, it is assumed that Disk 1 and Disk 2 have addresses for 100 blocks from "0" through "99" as logical block addresses LBA. If there is a data read request during rebuild, it is assumed that the ranges in which a read is to be performed on Disk 1 and Disk 2 are switched in 10 block units. If the quotient obtained by dividing the LBA relating to the read request by the number "10" of blocks is an even number, Disk 1 is selected. If it is an odd number, Disk 2 is selected. If the number of processes being performed is M=3 or more, and there is a biased load, the load is to be adjusted.

Assume that a disk device is selected on a basis of the quotient obtained by dividing the LBA by the number N of blocks=10, Disk 1 processes the read request for the LBA=3, 5, 7, 9, 21, 23, 25, and 27, and Disk 2 processes the read request for the LBA=11, 13, 15, 17, and 19, and there is a new read request for a new LBA=29. In this case, since the difference between the numbers of processes being performed by both disk devices is "3" or more, and the load of Disk 1 is high, Disk 1 is originally to be selected, but Disk 2 having a lower load is selected. In this process, the load of a read of each disk device can be balanced.

Assume that a new read request relating to the LBA=31 when Disk 1 processes the read requests of the LBA=1, 4, 7, 22, 25, and 28, and Disk 2 processes the LBA=10, 13, 16, and 19. In this case, since the difference between both disk devices is "1", and there is no biased load, Disk 2 determined depending on the quotient obtained by dividing the LBA 31 by N=10 is selected.

According to the second mode for embodying the present invention, when there is a data read request during rebuild other than the data read request in the rebuild process, it is determined whether or not there is a biased load between the two disk devices. If there is a biased load, then data is read from a disk device having a lower load, not from a disk device determined by the quotient obtained by dividing the LBA by a certain number N of blocks. Thus, the response of a disk device can be sped up by substantially leveling the load of each disk device.

According to the present invention, the unbalanced seek distance during rebuild of the head of each disk device can be reduced and the response of a disk device to a read request can be sped up. In addition, the biased load of each disk device can be reduced, and the unbalanced seek distance of the head of each disk during rebuild can be decreased.

The present invention is not limited to the above-mentioned mode for embodying the present invention, but can be configured as follows, for instance.

(1) The method of switching a disk device is not limited to a method of determining on the basis of whether a value obtained by dividing the logical block address LBA by a certain number of blocks is an even number or an odd number. However, for example, a determination can be made by determining whether or not a read address is within a certain address range assigned in advance to each disk device, and any disk selection method can be used so far as a read request having a high travel distance of a head can be substantially evenly assigned to each disk device.

(2) The present invention is not limited to the application to two disk devices, but can be applied to three or more disk devices.

(3) A certain block size unit as a reference in selecting a disk device is not a fixed value, but the block size can be variable depending on the access condition and the like.

What is claimed is:

1. A disk selection method for use with a plurality of disk devices having a mirroring configuration, the method comprising:

determining whether there is a read request from a host computer during a rebuild process in which data is copied from a normal disk device which stores same data as data stored in a faulty disk device to a rebuild destination disk device, a first rebuilt area in the normal disk device and a second rebuilt area in the rebuild destination disk device being divided into a plurality of areas each includes a certain number of blocks smaller than a number of blocks of an area that the normal disk device and the rebuild destination disk device are read out during a normal read performed when the rebuild process is not performed, one of the plurality of areas in the normal disk device and one of the plurality of areas in the rebuild destination disk device being alternately assigned as an area from which data is read when there is the read request from the host computer during the rebuild process; and when there is the read request from the host computer during the rebuild process, selecting one of the plurality of areas in the normal disk device or one of the plurality of areas in the rebuild destination disk device for reading data in units of the certain number of blocks.

2. The disk selection method according to claim 1, wherein:
it is determined during the normal read whether a read address is equal to or higher than a reference address;
the normal disk device and the rebuild destination disk device are switched and perform a read on the basis of a determination result; and
when there is the read request from the host computer during the rebuild process, alternately reading the data in units of the certain number of blocks.

3. The disk selection method according to claim 1, wherein one of the plurality of disk devices is selected depending on whether a value obtained by dividing a block address associated with the read request by an integer N is an even number or an odd number, and data is read.

4. The disk selection method according to claim 1, wherein one of the plurality of disk devices is selected depending on whether a block address associated with a read request is equal to or higher than an average value of a plurality of block addresses to be read, and when there is the read request from the host computer during the rebuild process, one of the normal disk device and the rebuild destination disk device is selected depending on whether a value obtained by dividing the block address associated with the read request by an integer N is an even number or an odd number, and data is read.

5. The disk selection method according to claim 1, wherein the plurality of disk devices are alternately selected in units of the certain number of blocks, which is ¼ or less than the maximum number of blocks of the disk device, and data is read.

6. A RAID control device, comprising:
a determination device determining, when the same data is stored in a plurality of disk devices, whether there is a read request from a host computer during rebuild process in which data is copied from a normal disk device which stores same data as data stored in a faulty disk device to a rebuild destination disk device, a first rebuilt area in the normal disk device and a second rebuilt area in the rebuild destination disk device being divided into a plurality of areas each includes a certain number of blocks smaller than a number of blocks of an area that the normal disk device and the rebuild destination disk device are read out during a normal read performed when the rebuild process is not performed, one of the plurality of areas in the normal disk device and one of the plurality of areas in the rebuild destination disk device being alternately assigned as an area from which data is read when there is the read request from the host computer during the rebuild process; and
a disk selection device selecting one of the plurality of areas in the normal disk device or one of the plurality of areas in the rebuild destination disk device for reading data in units of the certain number of blocks when the determination device determines that there is the read request from the host computer during the rebuild process.

7. The RAID control device according to claim 6, wherein the disk selection device reads data by switching a read destination disk device during the normal read depending on whether a read address is equal to or higher than a reference address, and when there is the read request from the host computer during the rebuild process, alternately switches the read destination disk device and reads data in units of the certain number of blocks unit.

8. The RAID control device according to claim 6, wherein when the determination device determines that there is the read request from the host computer during the rebuild process, the disk selection device selects one of the plurality of disk devices depending on whether a value obtained by dividing a block address associated with the read request by an integer N is an even number or an odd number, and reads data.

9. The RAID control device according to claim 6, wherein the disk selection device selects one of the plurality of disk devices depending on whether a block address associated with a read request during the normal read is equal to or higher than an average value of a plurality of block addresses to be read, and when the determination device determines that there is the read request from the host computer during the rebuild process, the disk selection device selects one of the normal disk device and the rebuild destination disk device depending on whether a value obtained by dividing the block address associated with the read request by an integer N is an even number or an odd number, and reads data.

10. The RAID control device according to claim 6, wherein the disk selection device alternately selects the plurality of disk devices in units of the certain number of blocks, which is ¼ or less than the maximum number of blocks of the disk device, and reads data.

11. A RAID system having a plurality of disk devices and a RAID control device for controlling the plurality of disk devices, and storing same data in the plurality of disk devices, the system comprising:
a determination device determining whether there is a read request from a host computer during rebuild process in which data is copied from a normal disk device which stores same data as data stored in a faulty disk device to a rebuild destination disk device, a first rebuilt area in the normal disk device and a second rebuilt area in the rebuild destination disk device being divided into a plurality of areas each includes a certain number of blocks smaller than a number of blocks of an area that the normal disk device and the rebuild destination disk device are read out during a normal read performed when the rebuild process is not performed, one of the plurality of areas in the normal disk device and one of the plurality of areas in the rebuild destination disk device being alternately assigned as an area from which data is read when there is the read request from the host computer during the rebuild process; and
a disk selection device selecting one of the plurality of areas in the normal disk device or one of the plurality of areas in the rebuild destination disk device for reading data in units of the certain number of blocks when the determination device determines that there is the read request from the host computer during the rebuild process.

12. The RAID system according to claim 11, wherein the disk selection device reads data by switching a read destination disk device during the normal read depending on whether a read address is equal to or higher than a reference address, and when the determination device determines that there is the read request from the host computer during the rebuild process, alternately switches the read destination disk device and reads data in units of the certain number of blocks.

13. The RAID system according to claim 11, wherein when the determination device determines that there is the read request from the host computer during the rebuild process, the disk selection device selects one of the plurality of disk devices depending on whether a value obtained by dividing a block address associated with the read request by an integer N is an even number or an odd number, and reads data.

14. The RAID system according to claim 11, wherein the disk selection device selects one of the plurality of disk devices depending on whether a block address associated with a read request during the normal read is equal to or higher than an average value of a plurality of block addresses to be read, and when the determination device determines that there is the read request from the host computer during the rebuild process, selects one of the normal disk device and the rebuild destination disk device depending on whether a value obtained by dividing the block address associated with the read request by an integer N is an even number or an odd number, and reads data.

* * * * *